United States Patent [19]
Ho

[11] Patent Number: 5,275,744
[45] Date of Patent: Jan. 4, 1994

[54] DERIVATIVES OF POLYALKYLENEPOLYAMINES AS CORROSION INHIBITORS

[75] Inventor: Andrew W. Ho, Pinole, Calif.

[73] Assignee: Chevron Research and Technology Company, San Francisco, Calif.

[21] Appl. No.: 942,242

[22] Filed: Sep. 9, 1992

Related U.S. Application Data

[63] Continuation-in-part of Ser. No. 774,002, Sep. 30, 1991, abandoned.

[51] Int. Cl.$^5$ .............................................. C23F 11/14
[52] U.S. Cl. .............................. 252/8.555; 106/14.15; 564/295; 564/290; 422/12; 252/392
[58] Field of Search .............................. 252/8.555, 392; 564/290, 295; 422/16, 12; 106/14.15

[56] References Cited

U.S. PATENT DOCUMENTS

| | | | |
|---|---|---|---|
| 2,736,658 | 2/1956 | Pfohl | 106/14.27 |
| 2,761,843 | 9/1956 | Brown | 252/8.551 |
| 3,200,106 | 8/1965 | Dickson et al. | 530/231 |
| 3,349,032 | 10/1967 | Krieg | 166/275 |
| 3,565,941 | 2/1971 | Dick et al. | 260/465.5 |
| 4,293,682 | 10/1981 | Kluger et al. | 528/123 |
| 4,314,083 | 2/1982 | Ford et al. | 564/479 |
| 4,900,458 | 2/1990 | Schroeder et al. | 252/8.555 |

Primary Examiner—Robert L. Stoll
Assistant Examiner—Valerie Fee
Attorney, Agent, or Firm—W. Priester; T. G. DeJonghe

[57] ABSTRACT

A composition of polyalkylenepolyamine derivatives useful as a corrosion inhibitor in aqueous media produced by reacting a starting polyalkylenepolyamine composition comprising a mixture of:

(i) at least one C-alkyl-ethylene diamine; and
(ii) at least one di-(C-alkyl)-diethylenetriamine;

wherein each C-alkyl group on the ethylene diamine and diethylenetriamine independently contain between 8–26 carbon atoms;

with a derivatizing agent which is either an alkylating agent or an alkylene oxide. Methods for preparing this composition and using it to inhibit the corrosion of corrodible metal alloys are also disclosed.

28 Claims, No Drawings

DERIVATIVES OF POLYALKYLENEPOLYAMINES AS CORROSION INHIBITORS

CROSS-REFERENCE TO RELATED APPLICATION

This application is a continuation-in-part of Ser. No. 774,002, filed Sept. 30, 1991, now abandoned.

BACKGROUND OF THE INVENTION

This invention relates to compositions comprising polyalkylenepolyamine derivatives which demonstrate improved properties as corrosion inhibitors when used in substantially aqueous media. This invention further concerns a method of making compositions of these water-soluble, polyalkylenepolyamine derivatives by reacting a hydrocarbon-soluble polyalkylenepolyamine composition with either an alkylating agent or an alkylene oxide. Additionally, this invention also relates to methods for using the polyalkylenepolyamine derivatives as effective corrosion inhibitors capable of protecting metal surfaces placed in contact with potentially corrosive chemicals.

Increasingly, industrial companies have begun to realize the economic importance of maintaining their equipment to ensure the longest operating life possible. This has been particularly true in the area of oil field operations.

As oil companies have been forced to go to new lengths in their search for oil, their operating equipment has also become more expensive and difficult to easily replace.

Given this level of investment, most companies have increasingly sought to rely on corrosion inhibitors to protect the metal surfaces on their drilling rigs and pipelines from the corrosive effects of the chemicals found in underground environments.

These corrosion inhibitors can either be applied directly to the potentially affected metal parts or injected into the oil well containing the corrosive chemicals. To achieve maximum effectiveness, the corrosion inhibitors should be dispersible or miscible in this underground medium.

Historically, alkylamines or polyamines have been the most commonly used corrosion inhibitors in oil well operations. A recent invention has also created compositions of polyalkylenepolyamines which are purported to possess even better corrosion inhibition properties. These chemical compositions are hydrocarbon-soluble, however, and experience in the field has shown that they are of limited effectiveness in the substantially aqueous environments one can potentially confront when drilling for oil. Since the base amines of these compositions are insoluble in an aqueous medium, they simply cannot work to maximum effectiveness as corrosion inhibitors in water-based environments.

The instant invention offers the ability to solve this limitation presently hampering these types of corrosion inhibitors. It proposes methods for the derivatization of polyalkylenepolyamine compositions into novel compositions of derivatized polyalkylenepolyamines.

These novel chemical compositions demonstrate increased water solubility, making them more effective in the heavily aqueous corrosive media, which are increasingly encountered in the ever-expanding search for new sources of oil.

In traditional oil production operations, the drilling rods are introduced into a subsurface environment largely consisting of hydrocarbon compounds. While some water is theoretically present in all wells, the corrosion and pitting which occur in these situations are largely the result of the effects of the hydrocarbon compounds on the rod. As noted previously, to achieve maximum effectiveness, a corrosion inhibitor should be dispersible in the medium in which it is to operate. Thus, the standard hydrocarbon-soluble amine or polyalkylenepolyamine composition provides adequate coverage in most "typical" oil production operations.

Increasingly, however, as our domestic supply of oil continues to dwindle, many oil companies are being forced to expand their quest for this valuable resource into many non-traditional areas. For example, a large percentage of the new wells being drilled are in substantially aqueous environments, presenting an even greater need to monitor the effects of corrosion on operating efficiency.

Numerous experiments have repeatedly demonstrated that the presence of water in underground environments greatly speeds up pitting and corrosion processes. Many new wells are affected by $CO_2$ corrosion resulting from the carbonic acid which forms when $CO_2$ comes in contact with water. Additionally, oxygen entering a heavily aqueous well also reacts with water in a manner that speeds up the effects of corrosion. Thus, it is especially vital to use effective corrosion inhibitors when operating in substantially aqueous media in order to counteract the added threat of corrosion in this type of environment.

Unfortunately, base amines and their more specialized polyalkylenepolyamine counterparts have not proven effective in these situations. Because most of these compounds are highly insoluble in water, when they are applied to drilling rods being used in substantially aqueous environments, they have shown a tendency to migrate from water, which is usually the layer in direct contact with the drilling rods, and dissolve in the hydrocarbon layer. With no protection between the dangerous aqueous layer and the drilling rod, corrosion proceeds relatively unabated.

Many in industry have attempted to solve this problem by searching for corrosion inhibitors which are dispersible in water, and thus effective in heavily aqueous media. The instant invention represents a successful culmination of one individual's efforts in this regard.

Numerous patents describe polyalkylenepolyamine compounds, their derivatives, and the processes for their production.

U.S. Pat. No. 4,314,083 discloses a process for selectively preparing non-cyclic polyalkylenepolyamine compounds by reacting an alkylenepolyamine compound with a hydroxy compound in the presence of a catalytically effective amount of salt, nitrogen, or sulfur-containing substance. This process is limited to short-chain alkyl groups consisting of no more than 4 carbon atoms.

U.S. Pat. No. 3,565,941 discloses a process for alkylating a polyalkylenepolyamine by first reacting the polyamine with an acid and then following with either an alkylating agent or a polyamine salt. This process is also specifically limited to hydrogen or short-chain alkyl groups of methyl or ethyl. The products also have limited uses as chemical intermediates, monomers, bases and flocculating agents.

Various other amine compounds have been recognized by the scientific community as effective in minimizing the corrosion of metal alloys. Prior patents disclose numerous quaternary, rosin and fatty amine compounds, as well as their corresponding derivatives, all of which are considered to be most beneficial in specific types of industrial operations. Alkylamines and polyamines are also accepted as particularly effective corrosion inhibitors in oil field operations. For years, however, researchers have been attempting to further refine these compounds in the hopes of developing other compositions which demonstrate even better corrosion inhibition properties.

U.S. Pat. No. 4,900,458, which is incorporated by reference in its entirety herein, represents a major success in this regard. Here, Schroeder et al. discovered methods for manufacturing novel polyalkylenepolyamine compositions in which an alkyl group of between 10-28 hydrocarbons was attached to the carbon atom instead of the nitrogen. This structural modification was shown to enable these hydrocarbon-soluble compositions to exhibit improved corrosion inhibition properties in oily media.

In contrast, the present invention provides excellent corrosion inhibitors useful in substantially aqueous media.

SUMMARY OF THE INVENTION

The instant invention relies upon the polyalkylenepolyamine compositions of U.S. Pat. No. 4,900,458 as its starting material. These compositions are reacted with either an alkylene oxide or an alkylating agent to yield highly water-soluble or dispersible derivatives of polyalkylenepolyamines. These derivatives demonstrate surprisingly improved abilities as corrosion inhibitors when used in aqueous media, far surpassing the results obtained by known basic amine inhibitors or the more specialized polyalkylenepolyamine starting materials referred to above.

This invention provides compositions of polyalkylenepolyamine derivatives which offer improved corrosion inhibition properties when used in substantially aqueous media. Specifically, but without limitation, these compositions are uniquely effective in certain operations involving the production and transportation of oil. In a preferred embodiment, the amine groups of the polyalkylenepolyamines are methylated prior to derivatization, with for example an alkyl halide or a dialkyl sulfate.

The instant invention provides a substantially water-soluble, corrosion-inhibiting, composition of polyalkylenepolyamine derivatives. This composition is obtained by reacting a mixture containing: (i) at least one C-alkylethylene diamine and (ii) at least one di-(C-alkyl)-diethylenetriamine; wherein each C-alkyl group on the ethylene diamine and diethylenetriamine independently contains from 8-26 carbon atoms, with specially selected alkylating agents or an alkylene oxide, preferably ethylene oxide. In a preferred embodiment, the amine groups of the polyalkylenepolyamines are methylated prior to derivatization, with for example, an alkyl halide or a dialkyl sulfate.

The instant invention also relates to a method of inhibiting corrosion on corrodible metals by directly applying the derivatized polyalkylenepolyamine composition to the potentially affected metal.

The instant invention also has specific applications in the oil production industry. It encompasses a method for inhibiting corrosion on corrodible metals used in or around substantially aqueous oil wells which involves injecting the composition of polyalkylenepolyamine derivatives directly into the underground oil well environment.

Among other factors, the instant invention is based on our discovery that a mixture of derivatized C-alkylethylene diamines and di-(C-alkyl)-diethylenetriamines, wherein each alkyl group independently contains from 8-26 carbon atoms, demonstrate excellent corrosion inhibition potential in substantially aqueous media. Because these derivatized polyalkylenepolyamine mixtures are water dispersible, they give at least 85% inhibition of $CO_2$ corrosion, and preferably greater than 90% inhibition, in the industry-standard wheel test with NACE brine. Preferred compositions are effective in the 250 to 25 ppm concentration range.

DETAILED DESCRIPTION OF THE PREFERRED EMBODIMENTS OF THE INVENTION

The instant invention provides a water-soluble composition of polyalkylenepolyamine derivatives which exhibit excellent corrosion inhibition properties when used in substantially aqueous media. The instant invention further discloses methods of producing derivatized compounds by reacting specific polyalkylenepolyamine compounds with specially selected alkylating agents qr alkylene oxides. Useful alkylating agents are those that react with primary, secondary or tertiary amines to make ammonium salts.

The terms "heavily aqueous" and "substantially aqueous" are used extensively and interchangeably throughout this application. As referred to herein, these terms are used to describe an environment that consists of more water than hydrocarbons. Preferably this ratio will be greater than 3 parts water to 1 part oil.

The specific derivatized compounds which are intended to be covered by this application are referred to as being either "soluble" or "dispersible" in water. Preferably, these compounds will possess a water dispersibility rating under 10 rating units, as measured by a Water Dispersibility Test using NACE brine as discussed in detail in Example 12. Ratings lower than 10 also reflect formulations which have a partition coefficient between water and octyl alcohol $\leq 2$.

As used herein, the terms "reaction" or "reacting" shall be taken to mean a chemical change that occurs by combination, replacement, decomposition or some modification thereof.

As used herein, the term "derivatized" shall be taken to mean the reaction of at least one of the polyalkylenepolyamine nitrogens with an alkylating or alkoxylating agent, i.e., with a derivatizing agent. When more than one of the nitrogens of a polyalkylenepolyamine structure are reacted with an alkylating or alkoxylating agent, the product is termed herein as "polyderivatized."

The Starting Polyalkylenepolyamines

Polyalkylenepolyamine compounds that can be used to produce my derivatized compositions are disclosed in detail in U.S. Pat. No. 4,900,458. The instant invention directly incorporates by reference the specific chemical compositions and their methods of preparation as described in detail therein.

The polyalkylenepolyamine compositions which provide the foundation for the instant invention contain a mixture of compounds. This mixture includes at least one C-alkyl-ethylene diamine as described in Structure 1 below.

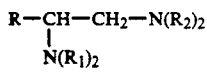

$$R-CH-CH_2-N(R_2)_2 \quad (1)$$
$$\quad | \quad$$
$$N(R_1)_2$$

In Structure 1, R is an alkyl group containing 8 to 26 carbon atoms. $R_1$ and $R_2$ individually can be any combination of hydrogen or lower alkyl groups. The terms "lower alkyl" and "lower alkyl group" mean alkyl groups from 1 to 5 carbon atoms, more preferably methyl or ethyl. Preferred compositions include those where the R group contains between 10 and 22 carbon atoms, preferably between 10 and 16, more preferably 12 and/or 14 carbon atoms; and where at least one of the $R_1$ or $R_2$ groups are lower alkyl, preferably where a plurality of these R groups are lower alkyl.

The starting polyalkylenepolyamines can be made from alpha olefins via epoxidation and reaction with amines, for example ammonia, in the presence of an amination catalyst For example, see U.S. Pat. No. 4,900,458. To clarify the nomenclature used herein: a $C_{14}$ alpha olefin produces a $C_{14}$ epoxide which in turn produces a $C_{14}$ polyalkylenepolyamine. The $C_{14}$ epoxide has an alkyl group of 12 carbon atoms on the epoxide ring and this produces polyalkylenepolyamines with alkyl groups of 12 carbon atoms.

The starting polyalkylenepolyamine composition also contains at least one di-(C-alkyl)-diethylenetriamine as detailed in Structure 2 below.

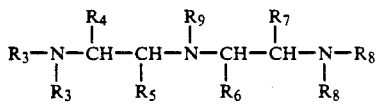

$$\begin{array}{ccccc} & R_4 & R_9 & R_7 & \\ & | & | & | & \\ R_3-N-CH-CH-N-CH-CH-N-R_8 & & & & (2) \\ | & | & | & | & \\ R_3 & R_5 & R_6 & R_8 & \end{array}$$

In Structure 2, $R_4$, $R_5$, $R_6$ and $R_7$ individually may be hydrogen or alkyl of 8 to 26 carbon atoms, provided that two of the $R_4$, $R_5$, $R_6$ and $R_7$ groups are hydrogen and two are alkyl. In Structure 2, $R_3$, $R_8$ and $R_9$ can individually be any combination of hydrogen and lower alkyl groups, as described above. Methods of preparing compounds of Structure 1 when $R_1$ and $R_2$ comprise methyl or of Structure 2 when $R_3$, $R_8$ and $R_9$ comprise methyl are disclosed in Examples 1C, 1D, and 1E, below.

In a preferred embodiment, reaction of an amine hydrogen (i.e., N—H) with formic acid and formaldehyde results in an N-methylated amine, where the N—H group has been converted to an N—CH$_3$ group. When there is more than one N—H group in a molecule (such as in the polyalkylene polyamines of U.S. Pat. No. 4,900,458) reaction with formic acid and formaldehyde will partially or totally convert all the N—H groups to N—CH$_3$ groups, depending on the reaction conditions and amounts of reactants. Substantially complete conversion is preferred. Another method of preparing compounds where $R_1$, $R_2$, $R_3$, $R_8$ and/or $R_9$ are lower alkyl is to use alkyl amines, such as methyl amine or dimethyl amine, instead of ammonia in the preparation procedures disclosed in U.S. Pat. No. 4,900,458 for the starting polyalkylenepolyamines.

As used herein, the term "N-methylated" polyalkylenepolyamines refers to the above-described polyalkylenepolyamines having one or two methyl groups on some or all of the amine nitrogens. When there are two methyl (or lower alkyl) groups on the nitrogen, alkylation— for example with an alkyl halide—results in a quaternary amine salt (a "quat") having a total of four alkyl groups on the nitrogen. These N-methylated polyalkylenepolyamines are useful as corrosion inhibitors in their own right, and are especially preferred compositions for preparing the polyalkylenepolyamine derivatives of this invention. These N-methylated polyalkylenepolyamines are preferred in part because of their lower meltpoints, as measured by differential scanning calorimetry. Lower meltpoints are economically advantageous in that less heat is required to melt the polyalkylenepolyamines prior to derivatization or formulation. Also, these N-methylated polyalkylenepolyamines are easier to apply in corrosion applications.

The terms "C-alkyl" and "di-(C-alkyl)" are also used at numerous points throughout this application. "C-alkyl" is meant to encompass any alkyl group that is directly bonded to a carbon atom in Structure 1, i.e. the R group. "Di-(C-alkyl)" refers to two alkyl groups which are each directly bonded to two different carbon atoms in Structure 2, i.e., two of the groups at $R_4$, $R_5$, $R_6$, or $R_7$.

Preparation of Polyalkylenepolyamine Derivatives

The water-soluble or water-dispersible polyalkylenepolyamine derivatives which are the subject of the instant invention are prepared by reacting the polyalkylenepolyamine mixtures of Structures 1 and 2 with various alkylating agents or alkylene oxides. Two preferred methods of preparation are outlined below.

1. Alkylation of the Polyalkylenepolyamines

A preferred method for obtaining derivatives of polyalkylenepolyamines is to react a polyalkylenepolyamine mixture containing Structure 1 and Structure 2 with an alkylating agent, BX. In this process, alkylation can occur on any single nitrogen, all the nitrogen centers, or any combination thereof. The derivatized versions of Structures 1 and 2 resulting from this reaction are shown in Structures 3 and 4, respectively.

The starting polyalkylenepolyamines can also be N-methylated by reaction with formic acid and formaldehyde as described in Examples 1C, 1D, 1E and 1F. These N-methylated products can then be alkylated to produce quaternary amine salts of this invention.

The derivatized water-soluble polyalkylenepolyamine composition consists of a mixture containing: (a) at least one derivatized C-alkyl-ethylene diamine as described in Structure 3 and (b) at least one derivatized di-(C-alkyl)-diethylenetriamine as described in Structure 4. Each C-alkyl group in the derivatized ethylene diamine and diethylenetriamine independently contains from 8-26 carbon atoms.

The derivatized C-alkyl-ethylene diamine is an ammonium salt described by Structure 3 below.

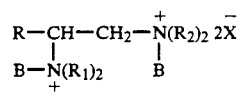

$$R-CH-CH_2-\overset{+}{N}(R_2)_2 \ 2X^- \quad (3)$$
$$\quad | \qquad\qquad |$$
$$B-\overset{+}{N}(R_1)_2 \quad B$$

In Structure 3, R is an alkyl group containing 8 to 26 carbon atoms. $R_1$ and $R_2$ individually can be hydrogen, lower alkyl, or any combination thereof. B is derived from the alkylating agent. Polyammonium salts having all the amine nitrogens alkylated are preferred.

A preferred derivatized di-(C-alkyl)-diethylenetriamine ammonium salt is described by Structure 4 below.

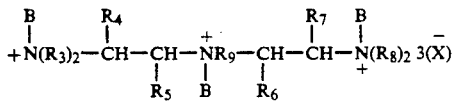

In Structure 4, $R_4$, $R_5$, $R_6$ and $R_7$ individually can be hydrogen or alkyl of 8 to 26 carbon atoms, provided that two of the $R_4$, $R_5$, $R_6$ and $R_7$ groups are hydrogen and two are alkyl. $R_3$, $R_8$ and $R_9$ can individually be any combination of hydrogen and lower alkyl groups. B is derived from the alkylating agent as described below. Polyammonium salts having all the amine nitrogens alkylated are preferred.

In both derivatized structures, the alkylating agent's alkyl group, B, can be an alkyl or aryl group, benzyl or alkylcarboxylate. Preferred alkyl groups are methyl, ethyl and benzyl. The anion, X, can be a halogen, including chloride, bromide and iodide, a sulfate, such as $O-SO_3-R$ or an equivalent anion which is readily displaced by the nucleophilic nitrogen of the amine. These types of anions are well known to those skilled in the art. Preferred leaving groups are chloride and methylsulfate. Preferred alkylating agents include benzyl chloride, methyl chloride, alpha-chloroacetic acid, dimethyl sulfate, and alpha-chloromethyl phosphoric acid.

It is preferable to react all of the amine nitrogens with the derivatizing agent, although partial derivatization can occur. The ratio of alkylating agent to polyalkylenepolyamine nitrogen can be from 20:1 to 0.05:1 on a molar basis; more preferably the ratio is from 2:1 to 1:1.

In one embodiment the present invention is a composition containing derivatives of polyalkylenepolyamines comprising mixtures of (i) at least one C-alkyl-ethylene diamine polyammonium salt and (ii) at least one di-(C-alkyl)-diethylenetriamine polyammonium salt. Here each C-alkyl group on the ethylene diamine and the diethylenetriamine independently contains between 8-26 carbon atoms. These polyammonium salts have more than one of the nitrogens of each of the derivatized polyalkylenepolyamines having a positive charge; preferably substantially all the nitrogen atoms of both components (i) and (ii) are positively charged. It is preferred to have polyammonium salts—salts with more than a single positive charge. These polyalkylenepolyamine derivatives are also be described as polyderivatized.

Preferred derivatized products include alkylation products of alkyl halides and sulfates with N-methylated polyalkylene polyamines.

More preferred derivatized products include (1) the products obtained by the reaction of benzyl chloride with N-methylated $C_{10}$, $C_{12}$, $C_{14}$, $C_{16}$, $C_{18}$, and $C_{20-24}$ polyalkylene polyamines and mixtures thereof; (2) the products obtained by the reaction of methyl chloride with N-methylated $C_{10}$, $C_{12}$, $C_{14}$, $C_{16}$, $C_{18}$, and $C_{20-24}$ polyalkylenepolyamines and mixtures thereof; (3) the products of the reaction of dimethyl sulfate with N-methylated $C_{10}$, $C_{12}$, $C_{14}$, $C_{16}$, $C_{18}$, and $C_{20-24}$ polyalkylenepolyamines and mixtures thereof; (4) the products of the reaction of alpha-chloromethyl phosphoric acid with $C_{10}$, $C_{12}$, $C_{14}$, $C_{16}$, $C_{18}$, and $C_{20-24}$ polyalkylenepolyamines and mixtures thereof; and (5) the products obtained by the reaction of alpha-chloromethyl phosphoric acid with N-methylated $C_{10}$, $C_{12}$, $C_{14}$, $C_{16}$, $C_{18}$, and $C_{20-24}$ polyalkylenepolyamines and mixtures thereof. Especially preferred products are prepared from $C_{12}$, $C_{14}$, or $C_{16}$ polyalkylenepolyamines, more preferably from $C_{14}$ and $C_{16}$ polyalkylenepolyamines.

Mixtures of polyalkylenepolyamines having more than one carbon number can be used as the starting material; for example, mixtures of $C_{10}$ polyalkylenepolyamines with $C_{14}$ polyalkylenepolyamines are useful corrosion inhibitors when derivatized. Preferred derivatives are extremely dispersible or soluble in water, making them effective corrosion inhibitors in substantially aqueous media.

2. Alkoxylation of the Polyalkylenepolyamines

A second method for obtaining a polyalkylenepolyamine derivative of this invention is to react a polyalkylenepolyamine mixture containing Structures 1 and 2 with an alkylene oxide. Alkoxylation of amines is well known in the art. Typical reaction conditions include temperature in the range of 80°14 100° C. and elevated pressure. This reaction produces a mixture of at least one N-alkoxylated C-alkyl-ethylenediamine and at least one N-alkoxylated di-(C-alkyl)-diethylenetriamine.

An N-alkoxylated C-alkyl-ethylenediamine of this invention is exemplified by Structure 5 below.

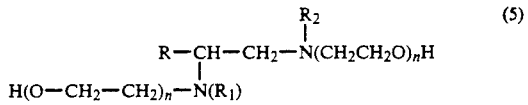

In Structure 5, R is an alkyl group containing 8 to 26 carbon atoms. $R_1$ and $R_2$ individually can be any combination of hydrogen and lower alkyl groups. Each n is independently between 0 and 4, with the sum of all n's being at least 1.

An N-alkoxylated di-(C-alkyl)-diethylenetriamine is described by a modified version of Structure 2, in which some or all of the $R_3$, $R_8$ and $R_9$ groups are ethoxy or polyethoxy, $(CH_2CH_2O)_nH$, and each n is independently between 0 and 4, with the sum of all n's being at least 1.

In one embodiment the present invention is a composition containing derivatives of polyalkylenepolyamines, comprising a mixture of (i) at least one C-alkyl-ethylene diamine poly-N-ethoxylate and (ii) at least one di-(C-alkyl)-diethylenetriamine poly-N-ethoxylate. Here each C-alkyl group on the ethylene diamine and the diethylenetriamine independently contains between 8-26 carbon atoms. In these poly-N-ethoxylated compositions, at least one of the nitrogens of each of the derivatized polyalkylenepolyamines has an ethoxy group (n=1) or a polyethoxy group (n>1), e.g., in the $(-CH_2-CH_2-O-)_n-H$ group of structures. Preferably substantially all the nitrogen atoms of both components (i) and (ii) are ethoxylated or polyethoxylated. These polyalkylenepolyamine derivatives can also be described as poly-derivatized.

Preferred ethoxylation agents are alkylene oxides such as ethylene oxide and propylene oxide; ethylene oxide is most preferred. The ratio of alkoxylating agent to amine nitrogen in the polyalkylenepolyamine can be in the range of from 100:1 to 0.5:1. Preferably it is in the range of from 10:1 to 1:1, more preferably 8:1 to 2:1. The amount of amine nitrogen is based on the total amine content of the polyalkylenepolyamine.

The derivatized, water-soluble polyalkylenepolyamine composition consists of a mixture containing: (a) at least one N-alkoxylated C-alkyl-ethylene diamine as described in Structure 5 and (b) at least one N-alkoxylated di-(C-alkyl)-diethylenetriamine as described hereinabove. Each C-alkyl group in the derivatized ethylene diamine and diethylenetriamine independently contains from 8–26 carbon atoms.

Corrosion Inhibition

Some of the derivatized polyalkylenepolyamine compositions of this invention have turned out to be surprisingly good corrosion inhibitors in heavily aqueous media. Because they are dispersible in the aqueous layer which is usually in direct contact with the corrodible metals or metal alloys, they demonstrate superior performance over other commercially-available, hydrocarbon-soluble, corrosion inhibitors. These compositions are particularly effective at inhibiting the corrosion which can occur on oil drilling rods and in underground pipelines used to transport oil.

The ability of these derivatized polyalkylenepolyamine compositions to act as effective corrosion inhibitors in these situations rests in part on the length of the alkyl group associated with each of the individual derivatized compounds. As has been noted in detail throughout this application, the alkyl groups which are part of our derivatized polyalkylenepolyamines are relatively long chains containing from 8 to 26 carbon atoms. Preferably, these chains will be between 8 and 16 carbons in length, more preferably between 10 and 14 carbon atoms.

Not wishing to be bound by any theory, it is believed that the length of the alkyl group affects the corrosion inhibition properties of the derivatized polyalkylenepolyamines. The nitrogen atoms which are part of these derivatized compounds are relatively polar and have been found to adhere to the potentially affected metal alloy. The long chain alkyl groups essentially form a "tail" which is very lipophilic in nature. When enough derivatized polyalkylenepolyamines are present, the hydrophobicity of these alkyl "tails" acts as a barrier and prevents corrosive oxygen and sulfur molecules from attacking the metal. Short alkyl chains on these polyalkylenepolyamines do not provide the coverage necessary to give effective corrosion inhibition.

In standard wheel tests using NACE brine at 90° C. tested in saturated $CO_2$ solution, various formulations of the derivatized polyalkylenepolyamine compositions of this invention provided at least 85% corrosion inhibition at 125 ppm of inhibitor. Most often, these compositions provided greater than 90% corrosion inhibition. These same compounds also demonstrated dispersibility ratings under 10 rating units as determined by the Water Dispersibility Test using NACE Brine as outlined in Example 12. It is the combination of these two factors which ensures effective corrosion inhibition in heavily aqueous environments.

The instant invention also relates to methods for using the derivatized polyalkylenepolyamine compositions as effective corrosion inhibitors. It is preferred to deliver the derivatized compositions to the potentially affected metal surface in a continuous process at a concentration ranging from 1 ppm–1000 ppm, preferably from 5 ppm–200 ppm, and most preferably between 10 ppm–100 ppm. Batch delivery in larger doses is also acceptable.

For use as corrosion inhibitors, the derivatized polyalkylenepolyamines of the invention are applied to the metal surfaces to be protected in a variety of ways known in the art. For example, a dilute aqueous solution of the derivatized polyalkylenepolyamine may be contacted with the metal to be protected, using methods such as dipping, spraying, wiping, and the like. For this method of application, solutions of about 0.1 to 10%, preferably from about 0.2 to 1%, by weight of derivatized polyalkylenepolyamine, or mixtures of derivatized polyalkylenepolyamine and other active corrosion inhibiting agents, are employed.

Alternatively, water-dispersible formulations of the present derivatized polyalkylenepolyamines, or mixtures of the derivatized polyalkylenepolyamines and other active corrosion inhibiting agents, can be added to a corrosive aqueous environment. In this method of application, sufficient amounts of derivatized polyalkylenepolyamines, or mixtures of the derivatized polyalkylenepolyamines and other active corrosion inhibiting agents, are added to give from about 1 to 1,000 ppm, preferably from 10 to 200 ppm, of active corrosion inhibitor in the final solution for continuous methods of treatment. For batch treatment methods, the level of corrosion inhibiting agents is generally between 500 and 25,000 ppm, preferably between 500 and 5,000 ppm.

Generally, corrosion inhibitors are formulated with other components for corrosion inhibiting application. Preferably, the corrosion inhibiting derivatized polyalkylenepolyamine composition of the present invention will be combined with one or more dimer/trimer acids to provide a formulated product. Dimer/trimer acids are well-known in the art and are typically derived from fatty acids. Examples of dimer/trimer acids include Empol 1024, Empol 1041 and Empol 1052, obtained from Emery Chemicals.

In addition to the derivatized polyalkylenepolyamine of the invention and the dimer/trimer acid, corrosion inhibiting formulations may also contain one or more surfactants, one or more alcohols, a small amount of a hydrocarbon and water. The surfactant employed may be ionic or nonionic in nature. The hydrocarbon may be any of the known solvents, such as kerosene, high aromatic distillate, diesel fuel, paint thinner, toluene, lubricating oil, and similar materials. A typical hydrocarbon is kerosene. Isopropanol or methanol are typical alcohols useful as solvents. Formulations containing at least 20 wt % water and/or alcohol are preferred.

Generally, the active corrosion inhibiting agents will be combined with a solvent and a surface-active agent to produce a concentrated solution of the corrosion inhibitor. In this solution, the derivatized polyalkylenepolyamine, or mixture of the derivatized polyalkylenepolyamine and other active corrosion inhibiting agents, will be present in amounts ranging from about 10 to 60%, preferably about 30 to 50%, by weight. The amount of solvent present is from about 30 to 80%, and the amount of surfactant is about 1 to 20%, by weight. This concentrated formulation is then diluted to the desired concentration of the final solution.

A typical water-dispersible formulation will contain about 15 to 30% of the present derivatized polyalkylenepolyamine, about 15 to 30% of a dimer/trimer acid, about 1 to 10% of a nonionic surfactant, about 0 to 10% of a hydrocarbon solvent, such as kerosene, and about 10 to 40% of an alcohol, such as isopropanol or methanol.

Water-dispersible formulations of the present derivatized polyalkylenepolyamines are particularly useful in brine/$CO_2$ or brine/$H_2S$ environments, such as encountered in oil wells, especially oil wells employing secondary oil recovery techniques.

The following examples illustrate the basic principles of this invention. They are not to be construed as limiting the invention in any way except as indicated by the appended claims.

EXAMPLES

Example A

MEASUREMENT OF TOTAL AMINE VALUE (TAV)

Total Amine Value (TAV), or Total Base Number (TBN) was measured using an ORION 960 autochemistry system sold by Orion Research Inc. The method is described in the Orion 960 Instruction Manual (1988) using the Gran function and technique 10. The TAV is the quantity of acid, expressed in term of the equivalent number of mg of KOH, that is required to neutralize all basic constituents present in 1 g of sample.

Example B

NITROGEN CONTENT

The weight percent nitrogen is determined using a Carlo Erba 1500 Nitrogen Analyzer. Nitrogen compounds were converted to nitrogen gas and detected with a thermal conductivity detector. Samples were weighted into a tared tin cup which was crimped and placed in an autosampler. The sample was dropped into a heated tube and totally combusted with oxygen over copper oxide and $Cr_2O_3$ catalysts. The combustion gases and helium carrier gas were swept through a reduction tube filled with copper metal fines to reduce nitrogen oxides to nitrogen gas. Water, and carbon dioxide were then scrubbed using 3A molecular sieves and ascarite. The remaining gas passed through a gas chromatographic column. The total amount of nitrogen was calculated by assuming that peak area is proportional to amount of nitrogen. Weight percent nitrogen in the sample was found by dividing the total amount of nitrogen by the sample weight.

Example 1

Procedures For Preparing Starting Materials

Outlined below are the typical procedures used to prepare polyalkylenepolyamine and methylated polyalkylenepolyamine compositions which serve as the starting materials for the compositions of this invention. Examples 1A to 1F describe useful methods of preparing these starting materials.

Examples 2-11 exemplify methods for making specific polyalkylenepolyamine derivatives. These procedures can readily be modified by those skilled in the art for polyalkylenepolyamines having different carbon numbers.

Example 1A

PREPARATION OF $C_{10}$ POLYALKYLENEPOLYAMINE

To a 1-liter autoclave equipped with an air-drive stirrer 250 g of $C_{10}$ epoxide (prepared from a decene heartcut), 38 g of wet Raney Nickel catalyst, and 16 cc of distilled water were added to 450 cc of liquid ammonia and 40 psig of hydrogen.

The mixture was stirred at 1500 rpm for 45 minutes until the composition reached 185° C. This temperature was maintained with stirring for 2.5 hours. The maximum pressure during the reaction was 2800 psig. The composition was then cooled to a temperature of 100° C. while stirring at 150 rpm. Excess ammonia was vented and the product was filtered to remove catalyst. A semisolid waxy amine product (243 g) was obtained. Structure of the product was confirmed by NMR. The product had a TAV of 367, and a DSC endpoint of 152° F.

Polyalkylenepolyamines of other carbon chain lengths were prepared from the corresponding epoxides using this procedure and adjusting the amounts charged to maintain a 10:1:1 mole ratio of ammonia/epoxide/water, while ensuring a maximum 75% autoclave fill factor at room temperature.

Raney Nickel is not a particularly active amination catalyst; usually 6-10 wt % based on the amount of epoxide in the reactor is used. The solid catalyst should be well dispersed during production of the polyalkylenepolyamines giving good suspensions of the catalyst.

Example 1B

PREPARATION OF $C_{14}$ POLYALKYLENEPOLYAMINE

The procedure of Example 1A was followed using 290.3 g of a $C_{14}$ epoxide. The procedure yielded 314 g of a $C_{14}$ polyalkylenepolyamine as the product.

Example 1C

PREPARATION OF N-METHYLATED $C_{10}$ POLYALKYLENEPOLYAMINE

To 60 g of the $C_{10}$ polyalkylenepolyamine of Example 1A, placed in a 1000 ml 3-necked round bottom flask sitting in an ice bath, 189.6 g of 98% formic acid was slowly added with constant stirring. The mixture was then removed from the ice bath. To this mixture, 185.4 ml of 37% formaldehyde solution was added. This new mixture was then heated at reflux (100°-110° C.). After approximately 10 minutes, carbon dioxide began to form. Once the evolution of carbon dioxide subsided, the reaction mixture was heated continuously at 100° C. for 16 hours.

Example 1D

FIRST PREPARATION OF N-METHYLATED $C_{14}$ POLYALKYLENEPOLYAMINE

A $C_{14}$ polyalkylenepolyamine was prepared as in Example 1B. To 150 g of this $C_{14}$ polyalkylenepolyamine, in a 2000 ml 3-necked round bottom flask sitting in an ice bath, 400 g of 98% formic acid was slowly added with constant stirring. The mixture was then removed from the ice bath and 500 g of 37% formaldehyde solution was added. This new mixture was then heated at reflux (100°-110° C.). After approximately 10 minutes, carbon dioxide began to form. Once the evolution of carbon dioxide subsided, the reaction mixture was heated continuously at 100° C. for 16 hours. After cooling to room temperature, excess reagent was removed under reduced pressure. The oily residue was dissolved in conc. HCl and washed with toluene. The aqueous layer was then basified with conc. NaOH and extracted with toluene. The toluene was evaporated to yield 158 g of a brown liquid product. The structure of the product was confirmed by IR and NMR spectra.

Example 1E

SECOND PREPARATION OF N-METHYLATED $C_{14}$ POLYALKYLENEPOLYAMINE

A $C_{14}$ polyalkylenepolyamine was prepared as in Example 1B. A 50 g of this $C_{14}$ polyalkylenepolyamine (6.6% of N), and 19.55 g of 98% formic acid was mixed in 200 ml 3-neck flask equipped with stirrer and condenser. The mixture was heated to 100° C. To this mixture 12.33 g of solid paraformaldehyde was added batchwise so that the liberation of carbon dioxide was controlled at a manageable rate. After carbon dioxide evolution subsided, the reaction mixture was heated at 100°-110° C. for 8 hours. The mixture was then cooled to room temperature and diluted with 200 ml of toluene (or diethyl ether), and the organic solution was washed with 100 ml of 5% aqueous sodium hydroxide. The organic layer was dried ($MgSO_4$), and solvent was removed in vacuo to give 70 g of an oily product. The structure of product was confirmed by IR and NMR spectra. The meltpoint, i.e., second DSC endpoint, for this product is 123° F.

Example 1F

PREPARATION OF N-METHYLATED AND $C_{16}$ POLYALKYLENEPOLYAMINES

A $C_{16}$ polyalkylenepolyamine was prepared from the $C_{16}$ epoxide in a manner similar to Example 1A. The produce had a meltpoint (DSC endpoint of 194° F. This produce was methylated as in Example 1E. The DSC endpoint of this produce was 109° F. As this example shows, the methylated produce had a substantially lower meltpoint than the starting polyalkylenepolyamine.

Example 2A

PREPARATION OF $C_{10}$ POLYALKYLENEPOLYAMINE REACTION PRODUCT WITH ALPHA-CHLOROMETHYL PHOSPHORIC ACID

A mixture of 20 g of the $C_{10}$ polyalkylenepolyamine of Example 1A (9.17 wt % N, 0.131 eq.), and 18.8 g of alpha chloromethyl phosphoric acid in 100 ml of methyl t-butyl ether solvent was heated at reflux (80° C.) for 30 hours under nitrogen. On removal of solvent it gave 36.5 g of a brown viscous oil, which soon became a glassy solid. Total Amine Value (TAV) analysis was consistent with the expected structure. The dispersibility and corrosion inhibition properties demonstrated by this product are outlined in Table 1, Run 20.

Example 2B

PREPARATION OF $C_{14}$ POLYALKYLENEPOLYAMINE REACTION PRODUCT WITH ALPHA-CHLOROMETHYL PHOSPHORIC ACID

The procedure of Example 2A was followed using the N-methylated $C_{14}$ polyalkylenepolyamine of Example 1D or 1E. The structure was checked by NMR and TAV analysis. The dispersibility and corrosion inhibition properties demonstrated by this product are outlined in Table 1 Run 35.

Example 3

PREPARATION OF $C_{10}$ POLYALKYLENEPOLYAMINE REACTION PRODUCT WITH PHOSPHOROUS ACID AND FORMALDEHYDE

To a mixture of 20 g of $C_{10}$ polyalkylenepolyamine (9.17 wt % N, 0 131 eq.), 12.99 ml (21.45 g, 0.262 mole) of phosphorous acid, and 21.23 ml of formaldehyde (37%, 0.262 mole) in a 3 neck round bottom flask, 52.32 ml of concentrated HCl was added dropwise. The reaction was slightly exothermic. After the addition of HCl, the mixture was heated at 100° C. for 5 hours. Aqueous work up and evaporation gave a solid product of mp 75°-88° C. The structure was checked by NMR and TAV analysis. The dispersibility and corrosion inhibition properties demonstrated by this product are outlined in Table 1, Run 21.

Comparative Example 4

PREPARATION OF $C_{10}$ POLYALKYLENEPOLYAMINE REACTION PRODUCT WITH DIMETHYL CARBONATE

Twenty (20) ml of dimethyl carbonate was added to a solution of 20 g of $C_{10}$ polyalkylenepolyamine (9.17% of N, 0.131 eq.), in 100 ml of anhydrous isopropyl alcohol. The reaction mixture was heated at reflux under nitrogen atmosphere for 48 hours. After removal of solvent in vacuum, 34 g of yellow brownish solid was obtained. TAV of product was 123.04 (TAV of starting amine was 367). The dispersibility of this product is poor, see Table 1, Run 22. This product is not a good water-dispersible corrosion inhibitor.

Example 5A

PREPARATION OF $C_{12}$ POLYALKYLENEPOLYAMINE REACTION PRODUCT WITH DIMETHYL SULFATE

A mixture of 20 g of a $C_{12}$ polyalkylenepolyamine (8.15% of N) prepared in the manner of Example 1A, and 15.41 g (0.1223 mole) of dimethyl sulfate was dissolved in 100 ml of anhydrous isopropyl alcohol. The mixture was heated at reflux under nitrogen gas for 5 hours. On removal of solvent it yielded 29.4 g of amber glassy product. Product was checked by NMR and TAV analysis. The dispersibility and corrosion inhibition properties demonstrated by this product are outlined in Table 1, Run 25.

Example 5B

PREPARATION OF $C_{14}$ POLYALKYLENEPOLYAMINE REACTION PRODUCT WITH DIMETHYL SULFATE

The procedure of Example 5A was followed using the N-methylated $C_{14}$ polyalkylenepolyamine of Example 1D or 1E Product was checked by NMR and TAV analysis. The dispersibility and corrosion inhibition properties demonstrated by this product are outlined in Table 1, Run 35.

Example 6

PREPARATION OF $C_{14}$ POLYALKYLENEPOLYAMINE REACTION PRODUCT WITH BENZYL CHLORIDE

A mixture of 20 g of $C_{14}$ polyalkylenepolyamine (6.99% of N, 0.099 eq.), and 13.28 g of benzyl chloride (0.105 mole) in 100 ml of isopropyl alcohol was heated at reflux for 15 hours. Reaction was monitored with reverse phase thin layer chromatography (TLC). After completion of reaction, solvent was removed under vacuum. It gave 30.48 g of a viscous liquid. Structure was confirmed by IR, NMR, and Total Amine Value analysis (=zero). The dispersibility and corrosion inhibition properties demonstrated by this product are outlined in Table 1, Run 26.

Example 7A

PREPARATION OF $C_{16}$ POLYALKYLENEPOLYAMINE REACTION PRODUCT WITH METHYL CHLORIDE

A solution of 20 g of $C_{16}$ polyalkylenepolyamine (TAV=240), in 80 ml of isopropyl alcohol was placed in an autoclave. To this solution 9.68 g (100% excess) of methyl chloride was charged. The mixture was heated at 100° C. with 500 psi of nitrogen pressure for 10 hours with vigorous stirring. Reaction was monitored with reverse phase TLC. After removal of solvent and excess methyl chloride, 23.35 g of solid product was obtained, mp >250° C. Product was checked by NMR and TAV (=6). The corrosion inhibition properties demonstrated by this product are outlined in Table 1, Run 29.

Example 7B

PREPARATION OF $C_{14}$ POLYALKYLENEPOLYAMINE REACTION PRODUCT WITH METHYL CHLORIDE

The procedure of Example 2A was followed using the N-methylated $C_{14}$ polyalkylenepolyamine of Example 1C or 1D. Results Table 1 Run 35.

Comparative Example 8

PREPARATION OF $C_{20-24}$ POLYALKYLENEPOLYAMINE REACTION PRODUCT WITH CHLOROACETAMIDE

A mixture of 20 g of $C_{20-24}$ polyalkylenepolyamine (4.8% N, 0.0685 eq.), and 6.55 g (0.07 mole) of chloroacetamide in 100 ml of toluene was heated at reflux under nitrogen for 52 hours. After cooling to room temperature, the solid precipitates were filtered and dried in a vacuum oven (50° C.). It yielded 16.5 g of product, mp 75°-120° C.; TAV =16.9, with 7.32% nitrogen. The dispersibility of this product is poor, see Table 1, Run 32. This product was not a good water dispersible corrosion inhibitor.

Example 9A

PREPARATION OF $C_{10}$ POLYALKYLENEPOLYAMINE REACTION PRODUCT WITH ETHYLENE OXIDE

A mixture of 25 g of $C_{10}$ polyalkylenepolyamine (10% of nitrogen, 0.178 eq.), 7.86 g of anhydrous ethylene oxide (0.178 eq.), 40 ml of acetonitrile, and 40 ml of t-butyl methyl ether was charged into a 100 ml autoclave cooled by dry ice and acetone bath. The mixture was heated to 86° C. and vigorously stirred for 4 hours. The autoclave was cooled to room temperature and vented. The mixture was placed on the rotatory evaporator to remove solvents. It yielded 30 g of brown oil as product (TAV=174, 6.82% of N). The product was tested as a corrosion inhibitor without further purification. The dispersibility and corrosion inhibition properties demonstrated by this product are outlined in Table 1, Run 23.

Example 9B

PREPARATION OF $C_{10}$ POLYALKYLENEPOLYAMINE REACTION PRODUCT WITH 10 ETHYLENE OXIDE EQUIVALENTS

A mixture of 25 g of $C_{10}$ polyalkylenepolyamine, (10% of nitrogen, 0.178 eq.), prepared in the manner as described in Example 1A, 78.6 g of anhydrous ethylene oxide (1.78 eq.), 1 ml of trifluoracetic acid, 200 ml of acetonitrile, and 100 ml of t-butyl methyl ether is charged into a 500 ml autoclave cooled by a dry ice-/acetone bath. The mixture is heated to 86° C. and vigorously stirred for 4 hours. The autoclave is cooled to room temperature and vented. The liquid is then product. This product is an effective corrosion inhibitor.

Example 10A

PREPARATION OF $C_{10}$ N-METHYLATED POLYALKYLENEPOLYAMINE REACTION PRODUCT WITH BENZYL CHLORIDE

A mixture of 20 g of $C_{10}$ N-methylated polyalkylenepolyamine (9.61% of N, 0.137 eq.) prepared in Example 1B, and 18.24 g of benzyl chloride (0.144 mole) in 100 ml of isopropyl alcohol was heated at reflux for 15 hours. Reaction was monitored with reverse phase TLC. After completion of reaction, solvent was removed under vacuum. It gave 34.4 g of a brownish, oily, liquid product. Structure was confirmed by IR, NMR, and TAV analysis (=zero). The dispersibility and corrosion inhibition properties demonstrated by this product are outlined in Table 1, Run 24.

Example 10B

FIRST PREPARATION OF $C_{14}$ N-METHYLATED POLYALKYLENEPOLYAMINE REACTION PRODUCT WITH BENZYL CHLORIDE

A mixture of 15 g of $C_{14}$ N-methylated polyalkylenepolyamine (7.14% of N, 0.0765 eq.) prepared in Example 10, and 9.68 g of benzyl chloride (0.0765 eq.) in a solution of 80 ml t-butyl methyl ether and 20 ml of acetonitrile was heated at reflux for 15 hours. Reaction was monitored with reverse phase TLC. After completion of reaction, solvent was removed under vacuum. It gave 20 g of a brownish, oily, viscous product. Structure was confirmed by IR, NMR, and TAV analysis (which was zero). Product was checked by NMR and TAV analysis. The dispersibility and corrosion inhibition properties demonstrated by this product are outlined in Table 1, Run 34.

Example 10C

SECOND PREPARATION OF $C_{14}$ N-METHYLATED POLYALKYLENEPOLYAMINE REACTION PRODUCT WITH BENZYL CHLORIDE

A mixture of 25 g of $C_{14}$ N-methylated polyalkylenepolyamine (5.49% of N, 0.098 eq.) preparation in Example 1E, and 11.17 g of benzyl chloride (0.088 eq.) in a solution of 50 ml of isopropyl alcohol was heated at reflux for 15 hours. Reaction was monitored with reverse phase TLC. After completion of reaction, solvent was removed under reduced pressure. It gave 36 g of viscous oil as product. Structure was confirmed by IR, NMR, and TAV analysis (which was zero).

After cooling to room temperature, excess reagent was removed under reduced pressure. The oily residue was dissolved in conc. HCl and washed with toluene. The aqueous layer was then basified with conc. NaOH and extracted with toluene. The toluene was evaporated to yield 64.5 g of a brown oily product. The structure of the product was confirmed by IR and NMR spectra. Product was checked by NMR and TAV analysis. The dispersibility and corrosion inhibition properties demonstrated by this product are outlined in Table 2, Run 34.

Example 11

BENZYL CHLORIDE QUATS OF METHYLATED AMINES

Additional benzyl chloride quats were prepared form a methylated $C_{16}$ polyalkylenepolyamine (to give a quat having 14 carbon atoms in the alkyl group side chain) and from a methylated $C_{20-24}$ polyalkylenepolyamine (to a give a quat having 18 to 22 carbon atoms in the alkyl group side chain).

TABLE 2

| PERCENT CORROSION PROTECTION AT 50 PPM | | |
|---|---|---|
| No. of Carbons in Alkyl Group | Methylated Amine | Benzyl Chloride Quat |
| 8 | 96.8 | 96.1 |
| 12 | 90.4* | 95.8 |
| 14 | 79.2* | 97.2 |
| 18-22 | — | 95.0 |

*Run at 1000 PPM conc. instead of 50 PPM (as 50 PPM was too low a level to observe corrosion protection for these amines).

Table 2 above summarizes the results for the continuous wheel test using polyalkylenepolyamines having a variety of carbon atoms in the alkyl group. (Note: a $C_{14}$ polyalkylenepolyamine produces a quat with 12 carbon atoms in the alkyl group). As can be seen, the benzyl chloride quats of these methylated amines are excellent corrosion inhibitors at very low concentrations (50 ppm).

Example 12

WATER DISPERSIBILITY TEST USING NACE BRINE

The water dispersibility test evaluates the dispersibility of corrosion inhibitor formulations used in water-based environments. Each formulation's dispersibility behavior was monitored for 24 hours in standard NACE Brine at a 90:10 ratio of brine to corrosion inhibitor formulation. The observations were tabulated so that the quality of the dispersions could be rated and compared on a numeric scale. The lower the rating, the more dispersible the formulation in aqueous environments.

In running this test, 45 ml of NACE Brine (which consists of 365.6 g of NaCl, 15.4 g of $CaCl_2$ and 7 g of $MgCl_2$ per liter of water) was added to a 50 ml closed-top graduated cylinder. Five ml of formulation consisting of 10% corrosion inhibitor in isopropyl alcohol was then added to the NACE Brine. If the formulation dispersed immediately, it was given a rating of zero.

If the formulation did not immediately disperse, the mixture was inverted once. It was noted whether the formulation dispersed in the NACE Brine at this point. If it failed to do so, the cylinder was inverted an additional 30 times and observed for any signs of dispersibility.

Each sample which had to be inverted was monitored after both 10 minutes and 24 hours to check for phase separations. Specifically, it was ascertained whether any cream layers, oil layers, or flocculation formulations were present. If so, the level of each layer (in ml) was measured. A cream layer is a milky or opaque combination of the oil and brine phases and could be twice the volume of the originally added formulation. An oil layer appeared as a clearly defined oil phase separated out on top of the brine or cream layer. Flocculation was observed as a separation of solid material and could be present in either a cream layer or oil layer.

The numeric ratings used to evaluate the formulation's dispersibility were based upon each sample's behavior at three time categories during the test.

A) Phase Behavior Upon Immediate Dissolution.
B) Phase Behavior After 10 Minutes.
C) Phase Behavior After 24 Hours.

At each stage, the solutions could exhibit the following four types of properties: 1) good dispersions (i.e., one phase either clear or opaque); 2) cream layer formation; 3) oil layer formation; or 4) flocculation formation. The overall rating scale combines the individual dispersibility results obtained at each of the three stages. It is rated heavily against flocculation and oil layer formation, the most telling signs of a lack of dispersibility.

A) Immediate Dissolution Calculation

| Rating Units | Comments |
|---|---|
| 0 | Self-disperses |
| 2 | One turn dispersion, one phase after 24 hours |
| 4 | One turn dispersion, separation in 24 hours |
| 6 | One turn dispersion, separation in 10 minutes |
| 8 | 30 turn dispersion, separation in 24 hours |
| 10 | 30 turn dispersion, separation in 10 minutes |
| 12 | 30 turns, no dispersion |

Note:
There are a maximum of 12 Rating Units at this stage.

B) 10-Minute Calculation

| | |
|---|---|
| Cream Formation: | 2 Rating Units for each ml of cream measured, up to a maximum of 10 Rating Units. |
| Cream & Oil Formation: | The maximum number of Rating Units for cream formation (10 Rating Units) added to 4 Rating Units for each ml of oil measured. If any oil is detected, even if it does not amount to 1 ml, 1 Rating Unit is added. |
| Flocculation: | Any flocculation results in 50 Rating Units. |

C) 24-Hour Calculation

While it is important for a formulation to stay dispersed indefinitely, its behavior after 10 minutes is more important. The 24-hour calculation is weighted to reflect this fact. The 24-hour evaluation was done the same way as the 10-minute evaluation -- except that the resulting number was then weighted by subtracting the 10-minute number from it and dividing by 2; that is, (24 Hr-10 Min.)/2.

Total Dispersion Calculation

The total number of Rating Units for a given formulation are obtained by combining the individual numbers calculated individually for A, B, and C as detailed above. The lower the number, the better the

Example 13
SAMPLE WATER DISPERSIBILITY TEST CALCULATION

A sample formulation was tested which showed the following dispersion characteristics: 1) It did not disperse immediately and only went into solution after 30 inversions; 2) It separated out after 10 minutes, revealing 3 ml of cream and 2 ml of oil; and 3) After 24 hours it had 1 ml of cream and 3 ml of oil.

---

Total Dispersion Calculation

A) Immediate Dissolution Calculation: 30 turn dispersion with separation in 10 minutes yields 10 Rating Units
B) 10-Minute Calculation
  Since cream and oil are both present after 10 minutes we start with the base level of 10 Rating Units. To this we add 4 Rating Units for each ml of oil present.
  Therefore,
  10-Minute Scale = (2 × 4) + 10 = 18 Rating Units
C) 24-hour Calculation
  We initially calculate the 24-hour number in the same manner as the 10-minute number. Since cream and oil are both present after 24-hours, we start with the base level of 10 Rating Units. To this we add 4 Rating Units for each ml of oil present. Therefore, since 3 ml of oil are present:
  24-hour Scale = (3 × 4) + 10 = 22 Rating Units
  We then need to calculate the 24-hour weighted number by subtracting the 10-minute calculation and dividing by two.
  24-hour weighted Number Scale:
  (22−18)/2 = 2 Rating Units
Total Dispersibility Rating
  Total Dispersibility = A + B + C = 10 + 18 + 2 = 30 Rating Units

---

Table 1 below summarizes the Water Dispersibility Test results for the derivatized polyalkylenepolyamines which are the subject of this invention.

Example 14
WHEEL TEST EVALUATION OF DERIVATIZED POLYALKYLENEPOLYAMINES AS CORROSION INHIBITORS FOR $CO_2$ CORROSION The Wheel Test is an industry standard test procedure used to evaluate corrosion inhibitors. The test is described in the National Association of Corrosion Engineers (NACE) publication ID182. The procedures followed in this example are essentially the same as those described in the NACE publication and are discussed below.

The test fluid consisted of 98% synthetic brine as described in NACE publication ID182 and 2% deodorized kerosene. The brine was flushed with nitrogen, then saturated with $CO_2$ gas at room temperature.

Test coupons were 5 ml thick mild steel shimstock and were sandblasted in a ball mill and tared prior to use. The test coupon, test fluid, and inhibitor were placed in a 7-oz. juice bottle taking care to avoid oxygen contamination. The inhibitor was added at a level of 125 ppm. The bottles were capped and placed on a rotating wheel mounted in a 90° C. oven for 24 hours.

Following the test, the coupons were removed from the bottles, rinsed with soap and water, dipped in 10% hydrochloric acid, and rinsed with water. A plastic wool pad was used to scrub any remaining corrosion products from the coupon, after which the coupon was rinsed, dried, and weighed to determine the weight loss. The percent corrosion inhibition provided by the inhibitor was calculated with reference to the weight loss of an uninhibited coupon, according to the following formula:

$$\% \text{ Inhibition} = \frac{\text{(Uninhibited weight loss} - \text{Inhibited weight loss)}}{\text{Uninhibited weight loss}}$$

Table 1 below summarizes the corrosion inhibition test results for the derivatized polyalkylenepolyamines which are the subject of this invention.

As can be seen by these results, the derivatized polyalkylenepolyamine compositions which were found to be most water soluble proved to be excellent corrosion inhibitors.

TABLE 1

| RUN NO. | REACTANTS | DISPERSIBILITY RATING[1] | CORROSION INHIBITION[2,3] |
|---|---|---|---|
| | $C_{10}$ POLYALKYLENEPOLYAMINE | | |
| 20 | ALPHA-CHLOROMETHYL PHOSPHORIC ACID | 5 | 95 |
| 21 | PHOSPHOROUS ACID AND FORMALDEHYDE | 5 | 96 |
| 22* | DIMETHYL CARBONATE | NOT DISPERSIBLE | — |
| 23 | ETHYLENE OXIDE | SLIGHTLY DISPERSIBLE | 87 |
| | $C_{10}$ N-METHYLATED POLYALKYLENEPOLYAMINE | | |
| 24 | BENZYL CHLORIDE | 2 | 98 |
| | $C_{12}$ POLYALKYLENEPOLYAMINE | | |
| 25 | DIMETHYL SULFATE | 4 | 94 |
| | $C_{14}$ POLYALKYLENEPOLYAMINE | | |
| 26 | BENZYL CHLORIDE | 5 | 93 |
| 27 | DIMETHYL SULFATE | 4 | 94 |
| 28 | ETHYLENE OXIDE | 21 | — |

TABLE 1-continued

Results at 125 ppm

| RUN NO. | REACTANTS | DISPERSIBILITY RATING[1] | CORROSION INHIBITION[2,3] |
|---|---|---|---|
| | $C_{16}$ POLYALKYLENEPOLYAMINE | | |
| 29 | METHYL CHLORIDE | NOT MEASURED | 96 |
| | $C_{20-24}$ POLYALKYLENEPOLYAMINE | | |
| 30 | ETHYLENE OXIDE | 20 | — |
| 31 | BENZYL CHLORIDE | 6 | 97 |
| 32* | CHLOROACETAMIDE | NOT DISPERSIBLE | — |

*COMPARATIVE EXAMPLES
[1] At 1% for 24 hours per Examples 12 and 13.
[2] Per Example 14 at 125 PPM.
[3] If dispersibility was poor, meaningful corrosion inhibition data could not be obtained.

TABLE 1A

Results at 50 ppm

| RUN NO. | REACTANTS | DISPERSIBILITY RATING[1] | CORROSION INHIBITION[2,3] |
|---|---|---|---|
| | $C_{14}$ N-METHYLATED POLYALKYLENEPOLYAMINE | | |
| 34 | BENZYL CHLORIDE | <4 | 95 |
| 35 | ALPHA-CHLOROMETHYL PHOSPHORIC ACID | <4 | 93 |
| 36 | METHYL CHLORIDE | <4 | 95 |
| 37 | DIMETHYL SULFATE | <4 | 94 |

*COMPARATIVE EXAMPLES
[1] At 1% for 24 hours per Examples 12 and 13.
[2] Per Example 14 at 50 PPM.
[3] If dispersibility was poor, meaningful corrosion inhibition data could not be obtained.

What is claimed is:

1. A corrosion inhibiting composition useful in aqueous media, comprising:
   polyalkylenepolyamine derivatives produced by reacting
   a) a derivatizing agent, which is either an alkylating agent or an alkylene oxide; with
   b) a starting polyalkylenepolyamine comprising a mixture of:
      (i) at least one C-alkyl-ethylene diamine; and
      (ii) at least one di-(C-alkyl)-diethylenetriamine;
   wherein each C-alkyl group on the ethylene diamine and the diethylenetriamine independently contain between 8-26 carbon atoms.

2. The composition according claim 1 wherein said polyalkylenepolyamine derivatives are either water soluble or have a water dispersibility rating under 10.

3. The composition according to claim 1 wherein said polyalkylenepolyamine derivatives are amine salts.

4. The composition according to claim 1 wherein said polyalkylenepolyamine derivatives are quaternary amine salts.

5. The composition of derivatized polyalkylenepolyamines according to claim 1 or 4 wherein each C-alkyl group contains between 8 to 16 carbon atoms.

6. The composition of derivatized polyalkylenepolyamines according to claim 5 wherein said C-alkyl group contains 12 or 14 carbon atoms.

7. The composition according to claim 1 wherein said starting polyalkylenepolyamines are N-methylated polyalkylenepolyamines.

8. The composition according to claim 1 wherein said polyalkylenepolyamine derivatives have a corrosion inhibition rating in aqueous media above 90%.

9. The composition according to claim 1 wherein the alkylating agent, BX, has B selected from the group consisting of hydrogen, an alkyl or aryl group, benzyl, or alkylcarboxylate and X selected from the group consisting of a halogen, sulfonate, carbonate, phosphonate or an anion which is readily displaced by nucleophilic nitrogen.

10. The composition described in claim 9 where the alkylating agent is an alkyl halide.

11. The composition described in claim 10 where the alkylating agent is methyl chloride.

12. The composition described in claim 10 where the alkylating agent is benzyl chloride.

13. The composition described in claim 10 where the alkylating agent is alpha-chloroacetic acid.

14. The composition described in claim 10 where the alkylating agent is alpha-chloromethyl phosphoric acid.

15. The composition described in claim 9 where the alkylating agent is dimethyl sulfate.

16. The composition described in claim 9 wherein the alkylating agent is a mixture of phosphorous acid and formaldehyde.

17. A composition according to claim 9 wherein the C-alkyl group contains 12 or 14 carbon atoms and the alkylating agent, BX, has B selected from the group consisting of lower alkyl or benzyl and X selected from the group consisting of chloride, bromide or methyl sulfonate.

18. The composition according to claim 1 wherein said polyalkylenepolyamine derivatives are obtained by reacting the starting polyalkylenepolyamine mixture with an alkylene oxide.

19. The composition described in claim 18 where the reactant is ethylene oxide.

20. A composition comprising N-methylated polyalkylenepolyamines which are useful for preparing compositions as described in claim 1.

21. A composition comprising a polyderivatized mixture of:
   (i) at least one C-alkyl-ethylene diamine; and (ii) at least one di-(C-alkyl)-diethylenetriamine;
wherein each C-alkyl group on the ethylene diamine and the diethylenetriamine independently contain between 8–26 carbon atoms.

22. The composition of claim 21 wherein substantially all the nitrogen atoms of said components (i) and (ii) are positively charged.

23. A composition containing derivatives of polyalkylenepolyamines useful as corrosion inhibitors in aqueous media, comprising:
a mixture of:
(i) at least one C-alkyl-ethylene diamine polyammonium salt; and
(ii) at least one di(C-alkyl)-diethylenetriamine polyammonium salt;
wherein each C-alkyl group on the ethylene diamine and the diethylenetriamine independently contain between 8–26 carbon atoms.

24. The composition of claim 23 wherein substantially all the nitrogen atoms of said components (i) and (ii) are positively charged.

25. A composition containing derivatives of polyalkylenepolyamines useful as corrosion inhibitors in aqueous media, comprising:
a mixture of:
(i) at least one C-alkyl-ethylene diamine poly-N-ethoxylate; and
(ii) at least one di-(C-alkyl)-diethylenetriamine poly-N-ethoxylate;
wherein each C-alkyl group on the ethylene diamine and the diethylenetriamine independently contain between 8–26 carbon atoms.

26. The composition of claim 25 wherein substantially all the nitrogen atoms of said components (i) and (ii) are ethoxylated.

27. A method of inhibiting corrosion of a corrodible metal wherein a corrosion inhibiting effective amount of the composition of polyalkylenepolyamine derivatives described in any one of claims 1, 21, 23 or 25 is contacted directly with the metal part.

28. A method of inhibiting corrosion of corrodible metal material used in oil field operations having oil wells wherein a corrosion inhibiting effective amount of the composition of polyalkylenepolyamine derivatives described in any one of claims 1, 21, 23 or 25 is injected into the said well.

* * * * *